C. F. CRAIG & W. FREEMAN.
SPRING TIRE.
APPLICATION FILED NOV. 19, 1915.

1,231,498.

Patented June 26, 1917.
3 SHEETS—SHEET 1.

WITNESSES:

INVENTORS
CARL F. CRAIG,
WILLIAM FREEMAN,
BY Munn & Co
ATTORNEYS

C. F. CRAIG & W. FREEMAN.
SPRING TIRE.
APPLICATION FILED NOV. 19, 1915.
1,231,498.
Patented June 26, 1917.
2 SHEETS—SHEET 2.
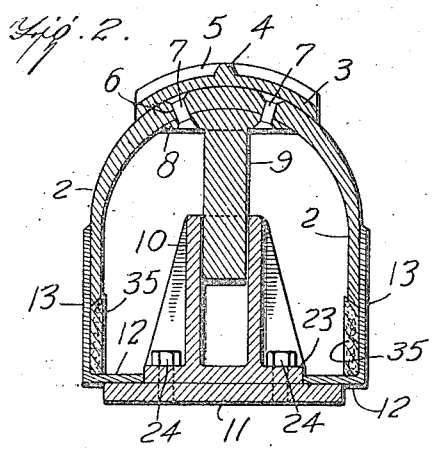
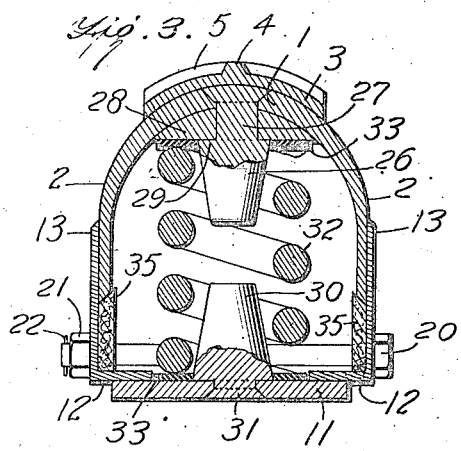
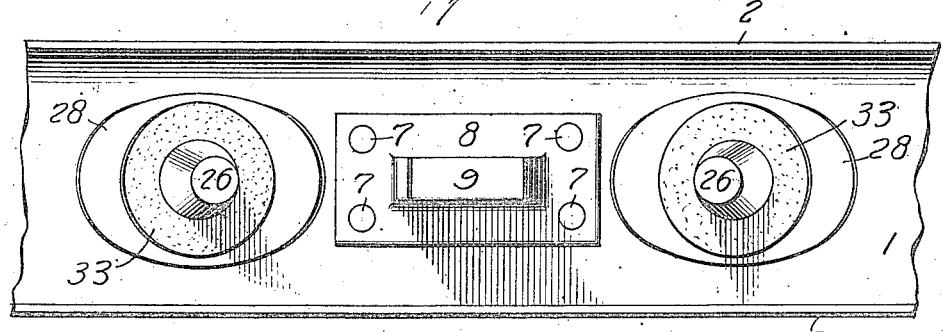
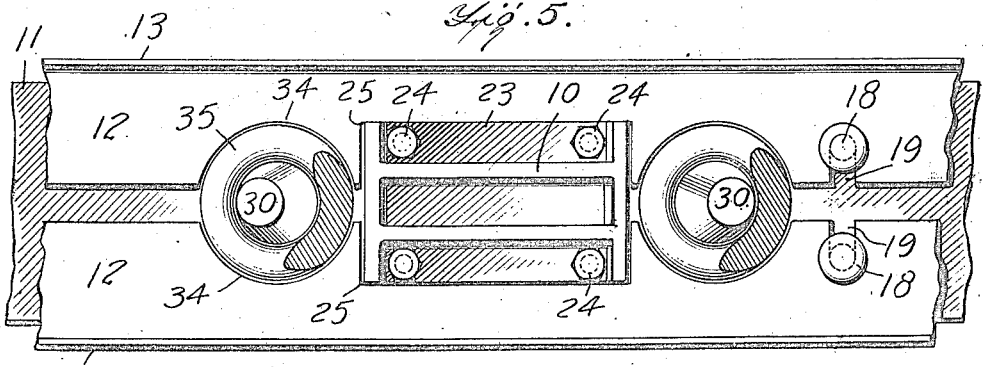
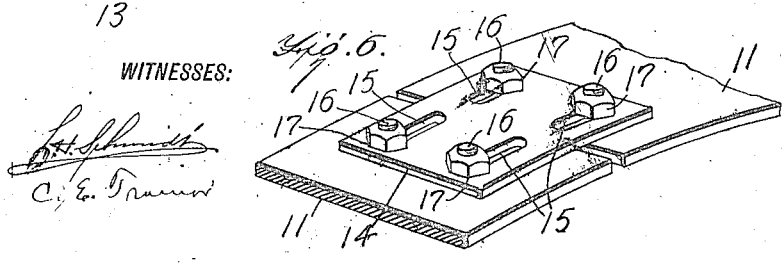
WITNESSES:
INVENTORS
CARL F. CRAIG,
WILLIAM FREEMAN
BY
ATTORNEYS

UNITED STATES PATENT OFFICE.

CARL F. CRAIG AND WILLIAM FREEMAN, OF POTTSBORO, TEXAS.

SPRING-TIRE.

1,231,498.   Specification of Letters Patent.   Patented June 26, 1917.

Application filed November 19, 1915. Serial No. 62,413.

*To all whom it may concern:*

Be it known that we, CARL F. CRAIG and WILLIAM FREEMAN, citizens of the United States, and residents of Pottsboro, in the county of Grayson and State of Texas, have invented a new and useful Improvement in Spring-Tires, of which the following is a specification.

Our invention is an improvement in spring tires, and the invention has for its object to provide a tire of the character specified, adapted for use with vehicles of any character, wherein the tire is composed of metal rim and tread members movable radially with respect to each other and having cushioning mechanism interposed between the same, and having means for limiting the angular movement of the tread and rim members with respect to each other.

In the drawings:—

Figure 1 is a side view of the improved tire with parts in section.

Figs. 2 and 3 are sections on the lines 2—2 and 3—3, respectively, of Fig. 1,

Fig. 4 is a partial plan view from the inner side of the tread member,

Fig. 5 is a similar view from the outer side of the rim member,

Fig. 6 is a partial perspective view showing the connection between the ends of the rim member.

Figures 1, 7, 8:
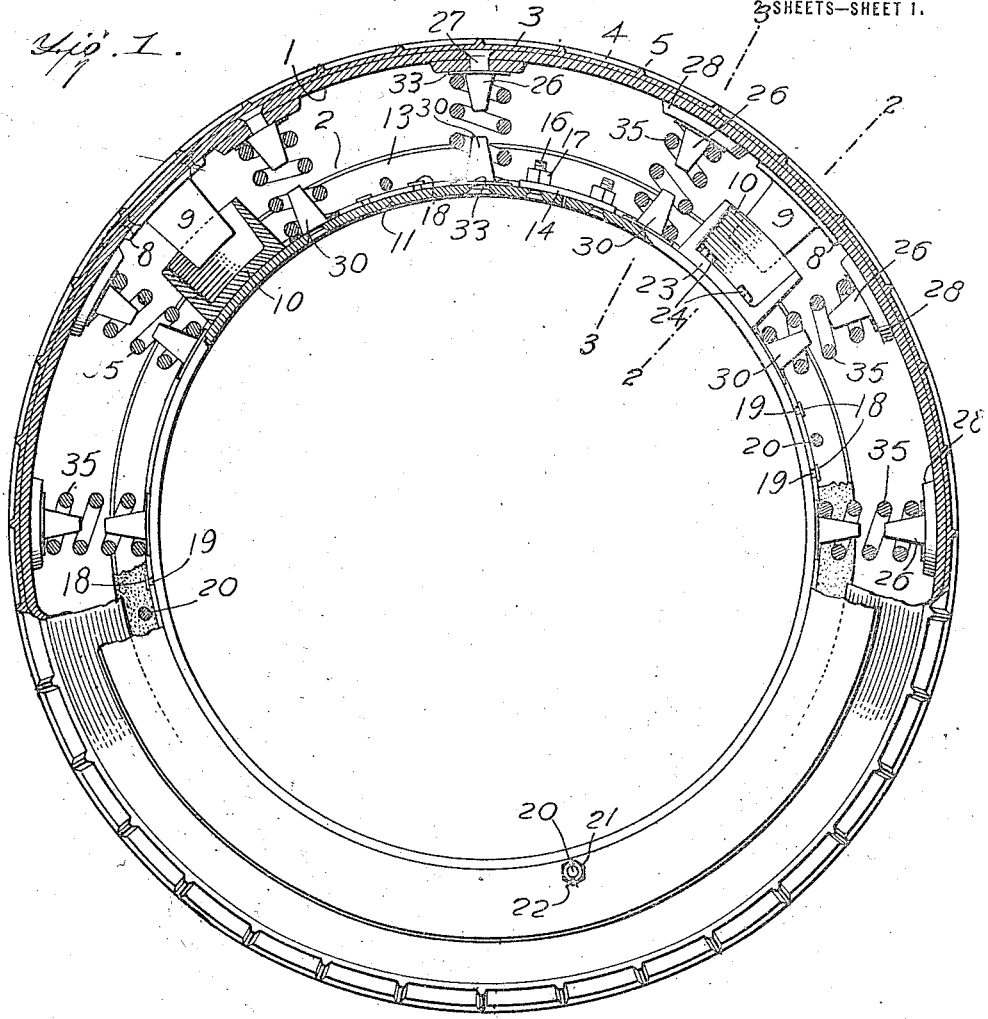
Fig. 7 is a transverse section of a modified form of tread member.
Fig. 8 is a plan view from the outer side of Fig. 7.

In the embodiment of the invention shown in Figs. 1 to 6, the improved tire is composed of an annular tread member of channel shape and an annular rim member likewise of channel shape. The tread member is arranged with its channel facing inwardly and the rim member is arranged with its channel facing outwardly and the side walls of the rim member lap upon the outer faces of the side walls of the tread member.

The tread member is U-shaped in cross section, comprising a body 1 and side walls 2, and the said tread or tread member is of pressed steel, the body at its center being twice the thickness of the side walls at their free edges. This tread member has secured to the outer face thereof at the body a tread 3, the said tread having a longitudinal or circumferential rib 4 at its center and having transverse ribs 5 intersecting the rib 4 at spaced intervals, and extending from one side edge of the tread to the other side edge.

The tread 3 may be secured to the tread member 1—2 in any suitable or desired manner and at suitable intervals pistons or plungers are secured to the body of the tread member at the inner face thereof. The tread member is provided with a pair of openings 6 at each plunger, and on opposite sides of the center of the body, and these openings are designed for receiving rivets 7, which are passed through the base 8 of the plunger 9, and through the openings 6, and the said rivets are headed at each end to rigidly connect the plungers 9 with the tread member.

The plungers 9 coöperate with guide casings 10 on the rim member, and the said rim member is composed of a belt 11 of metal or the like, and a pair of angle rings 12—13 which are connected with the belt. Each of these angle rings consists of a portion 12, abutting the outer face of the belt 11 at one side thereof, and a portion 13 extending at a right angle to the portion 12, and fitting outside of the adjacent side wall 2 of the tread member 1—2.

The ends of the belt 11 are connected together by an adjustable connecting plate 14, shown in Fig. 6. This plate has at each side edge a pair of longitudinally extending alined slots 15, and the said slots register with openings in the ends of the belt, and bolts 16 are passed through the registering openings and engaged by nuts 17 to clamp the parts together. By loosening the nuts at either end of the belt the ends of the belt may be adjusted toward and from each other, the bolts 16 moving in the slots 15 of the plate 14.

The angle rings are connected to the belt by means of rivets 18, which are passed through openings in the belt and through notches or recesses 19 in the edge of the portion 12. While the angle rings 12—13 may be moved toward each other or from each other they cannot move directly away from the belt 11 because of the rivets 18. The angle rings are connected by transverse bolts 20, which are passed through openings in the portions 12 near the portions 12, and each bolt 20 is engaged by a nut 21 on the opposite side of the tire.

A cotter pin 22 is passed through the end of the bolt at the end adjacent the nut to prevent disengagement thereof, and it will be evident that by turning the nut 21 the angle rings 12—13 may be moved toward each other to cause them to fit closely the outer faces of the side walls 2 of the tread members 1—2.

Each of the guide casings 10 is provided with a base 23, which is superposed on the outer face of the belt 11, and is secured thereto by means of screw bolts or screws 24, the said screws being passed through the base and in engagement with the belt. The portions 12 of the angle rings are notched or recessed as indicated at 25 at the base, so that the said portions 12 do not interfere with the base, and are not discommoded thereby in their movement of adjustment.

Each plunger 9 fits within a guide casing 10, and it will be noticed from an inspection of Figs. 4 and 5 that each guide casing while of approximately the same width as the plunger is of greater length, so that a limited angular movement is permitted between the plungers and the guide casings. The plungers and the guide casings however, limit the angular movement of the tread member with respect to the rim member, and cushioning mechanism is arranged between the tread member and the rim member for cushioning the movement of the parts with respect to each other.

Each of the cushioning mechanisms comprises a frusto-conical stop 26, which has a stem 27 at its large end and the stem is passed through registering openings in a washer 28, and in the body of the tread member, and the said stem is headed at the outer face of the tread member. The tread 3 fits over the up-set heads of the stems 7, and each washer is shaped to fit the concave inner face of the tread member at one face of the washer, the other face being plane.

A shoulder is provided between the stop 26 and the stem 27, and this shoulder 29 abuts against the plane face of the washer. A similar stop pin 30 is connected with the belt 11 in radial alinement with each stop 29, by means of a reduced stem 31 at the large end of the stop. This stem is passed through an opening in the belt member and up-set or headed at the inner face of the belt member. It will be noted that both the body of the tread member and the belt 11 are counterbored or reamed for receiving the up-set heads of the stems 27 and 31.

A coil spring 32 is arranged between each washer 28 and the belt, each spring embracing or encircling a stop 26 at one end and a stop 30 at the other. Washers 33 of resilient material, as for instance, rubber, encircle the stop members, one of the washers 33 resting on the outer face of the belt 11, while the other rests upon the plane face of the washer 28. The portions 12 of the angle rings are recessed at their adjacent edges to fit around the washers 33, as indicated at 34, and the springs do not directly engage the portions 12 of the angle rings.

The free edges of the side walls 2 of the tread member are beveled as shown in Figs. 2 and 3, and packing strips 35 of suitable material are arranged between the beveled edges of the side walls 2 and the portions 12 of the angle ring, the said packing strips fitting against the inner faces of the portions 13 of the angle rings.

It will be noticed from an inspection of Fig. 4 that the washers 28 have an elliptical outline and that the washers 33 are circular. The springs 35 are sufficiently strong to cushion shock and jar between the rim member and the tread member, and the weight of the springs and their spacing will depend to a considerable extent upon the load to be carried by the tire. The tread 3—4—5 prevents slipping and skidding of the tire, and if desired the metal tread may be provided with a solid tread portion of rubber or the like, as shown in Figs. 7 and 8. In this construction the tread member is of U-shape or channel-shape, comprising a body 36 and side walls 37, the channel facing inward as in Fig. 1. The tread carrying member is a channel-shaped ring, with the channel facing outward, and the ring is curved transversely to fit the peripheral surface of the tread member. The tread carrying member comprises a body 38, having at each side edge a continuous marginal rib or side wall 39.

A tread 40 of suitable material is arranged within the tread carrying member between the side walls 39 and fitting the convex face of the body 38. This tread 40 is continuous and it is secured to the tread carrying member and the tread member by means of rivets 41, which are arranged in series near each rib 39. The tread 40 may be of leather, rubber or the like, and the rivets 41 assist the tread to grip the supporting surface of the wheel.

The improved tire is designed for wheels of any character, and the side walls 2 of the tread member fitting within the portions 13 of the angle rings as they do, the entrance of dust is prevented. The plungers 9 and the guide casings 10 permit a limited angular movement of the rim member and the tread member with respect to each other, while at the same time they prevent displacement of the stop members 26 and 30 with respect to each other. The springs 35 thoroughly cushion all shock and jar, and by means of the bolts and nuts 20—21 the angle rings may be moved toward the side walls 2 of the tread members to compensate for wear and to make a tight joint. When the springs 35 are compressed the stop members 26 and 30 move toward each other and if the compression is carried far enough the small ends of the said members will contact to limit the movement of the tread and the rim members toward each other.

To place the tire the nuts 17 may be loosened to permit sufficient expansion of the belt 11 for the placing of the tire. The angle rings 12—13 may be removed by means of the nuts 21. In placing the tire on the wheel the tire is first dismounted and disassembled. The nuts 21 are released and one of the angle rings 12—13 is removed. The tread member may now be removed, and the rim may be placed on the rim of the wheel. After the rim has been placed, the nuts 16 are tightened after the belt 11 has been fitted closely to the rim of the wheel.

The tread member is now placed, after which the angle ring 12—13, which has been removed, is replaced. The rivets 18 serve as a guide for the replacing of the angle rings. After the angle ring has been replaced the nuts 21 are threaded on to the nuts 20 to hold the angle rings in proper relation with respect to the tread member and the tire is ready for use.

We claim:—

1. A spring tire, comprising a rim member consisting of a split belt, means for securing the ends together on the felly of the wheel, a pair of angle rings, each consisting of portions extending at approximately a right angle with respect to each other, one of the said portions of each ring fitting the outer face of the belt at one side thereof, means in connection with the belt and the rings for preventing angular movement of the rings with respect to the belt, means for drawing the angle rings toward each other, and a U-shaped tread member of annular form consisting of a body and side walls, the side walls fitting between the radial portions of the rings, a series of stops or abutments connected with the belt and extending radially therefrom, a series of similar stops or abutments connected with the body of the tread member and extending radially inward and registering with the abutments of the belt, a coil spring encircling each pair of abutments and arranged between the tread member and the belt, and means for permitting a limited angular movement of the tread member with respect to the rim member.

2. A spring tire, comprising a rim member consisting of a split belt, means for securing the ends together on the felly of the wheel, a pair of angle rings, each consisting of portions extending at approximately a right angle with respect to each other, one of the said portions of each ring fitting the outer face of the belt at one side thereof, means in connection with the belt and the rings for preventing angular movement of the rings with respect to the belt, means for drawing the angle rings toward each other, and a U-shaped tread member of annular form consisting of a body and side walls, cushioning mechanism arranged between the tread member and the rim member, and means for limiting the angular movement of the tread member with respect to the rim member.

CARL F. CRAIG.
WILLIAM FREEMAN.

Witnesses:
J. B. JARED,
W. H. BROGDON.